Patented Aug. 30, 1949

2,480,611

UNITED STATES PATENT OFFICE 2,480,611

REMOVAL OF HISTAMINE-LIKE IMPURITIES FROM STREPTOMYCIN

John C. Sheehan and Max Tishler, Rahway, N. J., assignors to Merck & Co., Inc., Rahway, N. J, a corporation of New Jersey No Drawing. Application March 20, 1946, Serial No. 655,903

12 Claims. (Cl. 260—210)

This invention relates to processes for the preparation of antibiotic substances and particularly to improvements in processes for preparing streptomycin whereby certain objectionable impurities and contaminants are effectively removed.

As reported in the literature, streptomycin is produced by cultivation of strains of *Actinomyces griseus* in a suitable culture medium, treating the culture broth with an adsorbent material and eluting the adsorbed streptomycin with alcoholic mineral acid. The crude concentrate of low potency or unit activity, which is thus obtained, is subjected to a number of treatments effecting a more or less step-wise concentration of streptomycin, generally in the form of acid salts such as streptomycin hydrochloride, and ultimately arriving at a substantially pure product having an activity of about 750–800 units/mgm. It has been found, however, that certain contaminants or impurities are very difficult to remove by known concentration and purification procedures. Thus, for example, colored impurities often persist even in the final product. While these colored impurities may not necessarily be harmful, they nevertheless are definitely objectionable in a product for therapeutic use. An even more objectionable impurity which also tends to persist in the final product is a histamine-like substance or mixture of substances. This impurity is largely responsible for toxic effects in the therapeutic use of streptomycin, particularly as observed in the histamine-like effect on blood pressure.

It is now discovered, in accordance with the present invention, that both colored impurities and histamine-like substances can be almost completely removed in a practical and efficient way by extracting neutral aqueous streptomycin solutions with phenol and removing residual phenol from the aqueous solution by extraction with suitable water-immiscible solvents such as isoamyl alcohol and ether. This phenol extraction can be carried out at almost any stage of the streptomycin concentration and purification. It is preferable, however, to extract with phenol a partially purified streptomycin concentrate such as crude streptomycin hydrochloride having an activity of the order of 200–300 units per mgm. or higher. Concentrates of other streptomycin salts such as, for example, streptomycin sulfate can be treated and purified by this procedure.

In carrying out the process of the present invention, the partially purified streptomycin concentrate is dissolved in water, the solution is filtered through a suitable filter aid such as "Super-Cel" (diatomaceous silica), and the pH is adjusted to about 6.5 by adding aqueous alkali such as N sodium hydroxide solution. The neutral solution is then extracted with phenol, preferably in the form of about 90% aqueous phenol at about 25° C. Extraction can be carried out batch-wise by extracting with several portions of aqueous phenol and combining the extracts, or continuously in a suitable extraction column. The aqueous solution is then extracted with suitable water-immiscible solvents such as isoamyl alcohol, isoamyl alcohol followed by ether, and the like, yielding an aqueous solution that gives a negative test (Millons) for phenol.

By this treatment 90 to 100% of the histamine-like substances is removed and the aqueous solution contains 90 to 97% of the original streptomycin activity. The mechanical separation of layers lowers the direct yield somewhat, but the total recovery of streptomycin activity can be made practically quantitative by washing the organic extracts with water. It is found that the ratio of histamine to streptomycin in the wash water is no greater than in the original starting solution, and that subsequent phenol extraction of the concentrated wash water removes 90 to 100% of the histamine-like substances therefrom. In addition to the substantially quantitative removal of histamine-like substances which is thus effected, almost all color is removed from the streptomycin solutions.

It is also found that the process of the present application, upon evaporating the aqueous solution obtained after phenol extraction, yields a concentrate having an activity markedly higher than the starting concentrate. The increase in potency or activity is more pronounced when the activity of the starting material is very low, but even in the case of more highly purified concentrates having an activity of the order of 600 units per mgm. a significant increase in activity is effected.

Phenol appears to be unique in its effectiveness. Certain solvents such as butyl alcohol have some effect in removing histamine from basic solutions, but are ineffective in neutral solutions. Water-immiscible solvents which are ineffective in this process include butanol, cyclohexanol, anisole, aniline, propionitrile, furfural, benzaldehyde, chloroform, benzene, nitrobenzene, and nitromethane. Solvents such as pyridine, methanol, dioxane, formaldehyde, acetic acid, and morpholine are miscible with aqueous solutions of streptomycin and therefore unsuitable. O-cresol is somewhat effective, but is so much less satisfactory than phenol that it is not considered to be an alternate extraction medium in the present process.

The following examples are illustrative of typical extraction and purification procedures in accordance with the present invention, but it is to be understood that these examples are given by way of illustration and not of limitation.

*Example I*

A solution of 711 g. of partially purified streptomycin hydrochloride, assaying 253 units/mg. in 1200 ml. of water, was filtered through a layer of "Super-Cel," using 100 ml. of water as a wash. Adjustment to pH 6.5 with N sodium hydroxide (95 ml.) brought the total volume of solution to 1600 ml. (1400 ml. of water used). This solution was extracted with four 700 ml. portions of 90% phenol, followed by three 700 ml. portions of isoamyl alcohol and 700 ml. of ether. At this point, the aqueous solution gave a negative test (Millons) for phenol.

A 800 ml. portion of water was used as a backwash of the organic layers, starting with the first phenol extract and continuing in succession through the isoamyl alcohol and ether extracts.

The original solution contained by assay 180,000,000 units of streptomycin with a ratio of 170 $\gamma$ streptomycin to 0.1 $\gamma$ histamine. After extraction, the solution retained 163,900,000 units of streptomycin with a ratio of 1,700 $\gamma$ streptomycin to 0.1 $\gamma$ histamine. The back-wash recovered 10,100,000 units with 170 $\gamma$ streptomycin to 0.1 $\gamma$ histamine. This represents a 90% removal of histamine-like impurities from the principal fraction, which contains 91% of the original streptomycin. The total recovery of activity is 97%. (Other experiments have removed 90-100% of histamine-like substances with similar recoveries of total activity and an increase in potency (units/mg.) of the solid of 10-50%, depending upon the impurities present.) Practically all color is removed from streptomycin solutions by this process.

*Example II*

A filtered solution of 1209 g. of partially purified streptomycin hydrochloride (620 u./mg.) (strong positive Pauly diazo test for histamine) was neutralized to pH 7.0 with N sodium hydroxide and diluted to 2570 ml. Four extractions of 1300 ml. each of 90% phenol, followed by three extractions with amyl acetate gave a practically colorless phenol-free solution. The solvent layers were back-washed successively with two 650 ml. portions of water.

By freeze-drying, 1067 g. of colorless streptomycin hydrochloride (653 u./mg.) was obtained from the main fraction. The Pauly test for histamine was negative and no histamine-like substances were detected physiologically at a level of 5000 $\gamma$ of streptomycin base per kilo of animal (cat) weight. From the back-washes, 105 g. (500 u./mg.) was recovered. This amounts to a direct yield of 93% with the additional material from the washes making the total recovery practically quantitative (99.8%).

Modifications may be made in carrying out the present invention without departing from the spirit and scope thereof, and our invention is to be limited only by the appended claims.

We claim:

1. The process for purifying streptomycin that comprises extracting a neutral aqueous streptomycin solution with about 90% aqueous phenol, and removing residual phenol from the aqueous streptomycin solution by extracting the same with a water-immiscible organic solvent that is a solvent for phenol.

2. The process for decolorizing streptomycin that comprises extracting a neutral aqueous streptomycin solution with about 90% aqueous phenol, and removing residual phenol from the aqueous streptomycin solution by extracting the same with a water-immiscible organic solvent that is a solvent for phenol.

3. The process for removing substances having a histamine-like effect on blood pressure from streptomycin that comprises extracting a neutral aqueous streptomycin solution with about 90% aqueous phenol, and removing residual phenol from the aqueous streptomycin solution by extracting the same with a water-immiscible organic solvent that is a solvent for phenol.

4. The process that comprises dissolving a crude concentrate of streptomycin in water, adjusting the pH of the solution to about 6.5, extracting the solution with about 90% aqueous phenol, extracting the resulting aqueous solution with isoamyl alcohol, and recovering an aqueous solution of streptomycin that is substantially free of colored impurities and substances having a histamine-like effect on blood pressure, and free of phenol.

5. The process that comprises dissolving a crude concentrate of streptomycin in water, adjusting the pH of the solution to about 6.5, extracting the solution with about 90% aqueous phenol, extracting the resulting aqueous solution with isoamyl alcohol and then with ether, and recovering an aqueous solution of streptomycin that is substantially free of colored impurities and substances having a histamine-like effect on blood pressure, and free of phenol.

6. The process that comprises dissolving a crude concentrate of streptomycin in water, adjusting the pH of the solution to about 6.5, extracting the solution with about 90% aqueous phenol, extracting the aqueous solution with isoamyl alcohol to form a streptomycin solution substantially free of colored impurities and substances having a histamine-like effect on blood pressure, and free of phenol, and back-washing the organic solvent extract with water to recover streptomycin therefrom.

7. The process that comprises dissolving a crude concentrate of streptomycin in water, adjusting the pH of the solution to about 6.5, extracting the solution with about 90% aqueous phenol, extracting the aqueous solution with isoamyl alcohol and then with ether to form a streptomycin solution substantially free of colored impurities and substances having a histamine-like effect on blood pressure, and free of phenol, and back-washing the organic solvent extracts with water to recover streptomycin therefrom.

8. The process that comprises dissolving a crude concentrate of streptomycin in water, adjusting the pH of the solution to about 6.5, extracting the solution with about 90% aqueous phenol, extracting the resulting aqueous solution with isoamyl alcohol and then with ether, and drying the aqueous solution thus obtained, thereby recovering purified streptomycin which is substantially free of substances having a histamine-like effect on blood pressure, free of phenol, and which has a higher activity in units per milligram than the starting material.

9. The process that comprises dissolving partially purified streptomycin hydrochloride in water, adjusting the pH of the solution to about 6.5, extracting the neutral solution with about 90% aqueous phenol, and then with isoamyl alcohol, and recovering a streptomycin solution substantially free of colored impurities and substances having a histamine-like effect on blood pressure, and free of phenol.

10. The process that comprises dissolving partially purified streptomycin hydrochloride in water, adjusting the pH of the solution to about 6.5, extracting the neutral solution with about 90% aqueous phenol, and then with isoamyl alcohol, and drying the aqueous solution thus obtained, thereby recovering streptomycin hydrochloride which is substantially free of colored impurities and substances having a histamine-like effect on blood pressure, free of phenol, and which has a higher activity in units per milligram than the starting material.

11. The process that comprises dissolving a crude concentrate of streptomycin in water, adjusting the pH of the solution to about 6.5, extracting the solution with about 90% aqueous phenol, extracting the resulting aqueous solution with amyl acetate, and recovering an aqueous solution of streptomycin that is substantially free of colored impurities and substances having a histamine-like effect on blood pressure, and free of phenol.

12. The process that comprises dissolving partially purified streptomycin hydrochloride in water, adjusting the pH of the solution to about 6.5, extracting the neutral solution with about 90% aqueous phenol, and then with amyl acetate, and recovering a streptomycin solution substantially free of colored impurities and substances having a histamine-like effect on blood pressure, and free of phenol.

JOHN C. SHEEHAN.
MAX TISHLER.

REFERENCES CITED

The following references are of record in the file of this patent:

Morton: "Laboratory Technique in Organic Chemistry" (McGraw-Hill; New York; 1938), pages 198–202.